(12) United States Patent
Mandal et al.

(10) Patent No.: US 10,700,862 B2
(45) Date of Patent: Jun. 30, 2020

(54) REDUCED DATA SET DIGEST

(71) Applicant: FUJITSU LIMITED, Kawasaki-shi, Kanagawa (JP)

(72) Inventors: Avradip Mandal, Sunnyvale (CA); Arnab Roy, Santa Clara (CA); Hart Montgomery, Redwood City (CA)

(73) Assignee: FUJITSU LIMITED, Kawasaki (JP)

( * ) Notice: Subject to any disclaimer, the term of this patent is extended or adjusted under 35 U.S.C. 154(b) by 369 days.

(21) Appl. No.: 15/699,830

(22) Filed: Sep. 8, 2017

(65) Prior Publication Data

US 2019/0081785 A1 Mar. 14, 2019

(51) Int. Cl.
*H04L 9/14* (2006.01)
*H04L 9/30* (2006.01)
*H04L 9/08* (2006.01)
*H04L 9/32* (2006.01)

(52) U.S. Cl.
CPC .............. *H04L 9/14* (2013.01); *H04L 9/0891* (2013.01); *H04L 9/30* (2013.01); *H04L 9/3239* (2013.01); *H04L 2209/38* (2013.01)

(58) Field of Classification Search
CPC . H04L 9/14; H04L 9/0891; H04L 9/30; H04L 9/3239
USPC .......................................................... 380/277
See application file for complete search history.

(56) References Cited

U.S. PATENT DOCUMENTS

| | | | | |
|---|---|---|---|---|
| 7,076,061 B1* | 7/2006 | Lenstra | ................. | H04L 9/3013 380/28 |
| 8,515,058 B1* | 8/2013 | Gentry | ................... | H04L 9/008 380/28 |
| 8,693,690 B2* | 4/2014 | Relyea | ................... | G06F 21/602 380/277 |
| 2004/0143742 A1* | 7/2004 | Muratani | ................ | G06T 1/005 713/176 |
| 2006/0282670 A1* | 12/2006 | Karchov | ............. | H04L 63/0823 713/175 |
| 2008/0080718 A1* | 4/2008 | Meijer | ................ | G06F 21/6245 380/282 |

(Continued)

OTHER PUBLICATIONS

Libert, Benoît, Kenneth G. Paterson, and Elizabeth A. Quaglia. "Anonymous broadcast encryption: Adaptive security and efficient constructions in the standard model." International Workshop on Public Key Cryptography. Springer, Berlin, Heidelberg, 2012.

(Continued)

*Primary Examiner* — Farid Homayounmehr
*Assistant Examiner* — Thanh T Le
(74) *Attorney, Agent, or Firm* — Maschoff Brennan (57) ABSTRACT

A method may include obtaining public keys for each user of a set of users, where each user is associated with a unique public key and a unique private key. The method may also include obtaining a designated set of users, where the designated set of users is a subset of the set of users. The method may additionally include generating, using the public keys, a digest associated with the designated set of users. The digest includes reduced data sets in a secure form, where each user of the set of users is associated with one of the reduced data sets that is indicative of whether the user is in the designated set of users, and the reduced data set is accessible using the private key of the user. The method may also include posting the digest to a location accessible from an electronic device of the user.

20 Claims, 7 Drawing Sheets

(56) References Cited

U.S. PATENT DOCUMENTS

| | | | | |
|---|---|---|---|---|
| 2008/0298579 | A1* | 12/2008 | Abu-Amara | H04L 63/061 380/30 |
| 2009/0208015 | A1* | 8/2009 | Kamat | G06F 21/10 380/277 |
| 2011/0013771 | A1* | 1/2011 | Camenisch | H04L 9/3252 380/46 |
| 2012/0311670 | A1* | 12/2012 | Johnsen | H04L 9/3234 726/3 |
| 2013/0073854 | A1* | 3/2013 | Patti | H04L 9/0825 713/171 |
| 2014/0122899 | A1* | 5/2014 | Hiwatari | H04L 9/3218 713/189 |
| 2014/0372752 | A1* | 12/2014 | Sallis | G06F 21/32 713/165 |
| 2016/0224735 | A1* | 8/2016 | Ayday | H04L 9/14 |
| 2016/0241399 | A1* | 8/2016 | Huang | H04L 9/0833 |
| 2017/0289111 | A1* | 10/2017 | Voell | H04L 63/0435 |
| 2018/0006811 | A1* | 1/2018 | Zhu | H04L 29/06 |
| 2018/0343114 | A1* | 11/2018 | Ben-Ari | H04L 9/0825 |
| 2019/0347433 | A1* | 11/2019 | Chakravorty | G06F 21/6209 |

OTHER PUBLICATIONS

Barth, Adam, Dan Boneh, and Brent Waters. "Privacy in encrypted content distribution using private broadcast encryption." International Conference on Financial Cryptography and Data Security. Springer, Berlin, Heidelberg, 2006.

Boneh, Dan, Craig Gentry, and Brent Waters. "Collusion resistant broadcast encryption with short ciphertexts and private keys." Crypto. vol. 3621. 2005.

Goyal, Vipul, Omkant Pandey, Amit Sahai, and Brent Waters. "Attribute-based encryption for fine-grained access control of encrypted data." In Proceedings of the 13th ACM conference on Computer and communications security, pp. 39-98. Acm, 2006.

Bethencourt, John, Amit Sahai, and Brent Waters. "Ciphertext-policy attribute-based encryption." Security and Privacy, 2007. SP'07. IEEE Symposium on. IEEE, 2007.

Oded Goldreich and Leonid A. Levin. A hard-core predicate for all one-way functions. In Proceedings of the Twenty First Annual ACM Symposium on Theory of Computing, pp. 25-32, 1989.

D. Boneh and I. E. Shparlinski. On the unpredictability of bits of the elliptic curve diffie-hellman scheme. In Advances in Cryptology—CRYPTO, pp. 201-212, 2001.

Fazio, Nelly, et al. "Hard-core predicates for a Diffie-Hellman problem over finite fields." Advances in Cryptology—CRYPTO 2013. Springer, Berlin, Heidelberg, 2013. 148-165.

Goldreich, Oded, Shafi Goldwasser, and Silvio Micali. "How to construct Random functions." Foundations of Computer Science, 1984. 25th Annual Symposium on. IEEE, 1984.

Diffie, Whitfield, and Martin Hellman. "New directions in cryptography" IEEE transactions on Information Theory 22.6 (1976): 644-654.

* cited by examiner

REDUCED DATA SET DIGEST

FIELD

The embodiments discussed in the present disclosure are related to a reduced data set digest.

BACKGROUND

With the proliferation of computer networks, there has also arisen a variety of malicious actors seeking to access information communicated over computer networks. In some circumstances, a user may desire to know if they are on a posted list, such as a list of mortgages sold from one bank to another. However, the posting to and notification of such a list may be problematic, particularly when security is considered.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

One or more embodiments of the present disclosure may include a method. The method may include obtaining multiple public keys associated with a set of users, each user of the set of users associated with a unique public key and a unique private key, the plurality of public keys including the unique public keys of the set of users. The method may also include obtaining a designated set of users, where the designated set of users is a subset of the set of users. The method may additionally include generating, using the plurality of public keys, a digest associated with the designated set of users. The digest may include a plurality of reduced data sets in a secure form, where each user of the set of users is associated with one of the plurality of reduced data sets, and the reduced data sets are indicative of whether a given user is in the designated set of users, and the reduced data set associated with the given user is accessible in the secure form using the private key of the given user. The method may also include posting the digest to a location accessible from an electronic device of the given user.

The object and advantages of the embodiments will be realized and achieved at least by the elements, features, and combinations particularly pointed out in the claims.

It is to be understood that both the foregoing general description and the following detailed description are merely examples and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

The present disclosure relates to, inter alia, the use of a reduced data set digest. As used herein, a digest is a data structure that includes information regarding sets of users. For example, a digest may include an indication whether or not each user of a set of users is included in a designated sub-set of the users. The digest may operate similar to a digital "bulletin board" where an inquiring user may analyze the digest to determine whether the inquiring user is in the designated sub-set of the users or not. Additionally, the digest may be structured such that anonymity is preserved between the inquiring user and the other users of the set of users such that the inquiring user may determine whether or not the inquiring user is in the designated set but may not be able to make such a determination for other users.

To generate such a digest, a publisher may obtain information (e.g., a single bit) for each user, whether or not the user is in the designated set, and a public key for each of the users in the set of users. The publisher may perform operations to generate a reduced data set associated with each user such that an inquiring user may derive the information indicative of whether or not the inquiring user is in the designated set using the private key of the inquiring user. In some embodiments, each of the reduced data sets in the digest may include a single bit.

The use of a reduced data set digest may provide a number of benefits to the operation of a computer itself, and to a network communicating such data. With respect to the computer itself, the reduced data set digest may provide a significant space savings compared to other techniques. For example, the use of a single bit for each user, even when in a secured format, saves a significant amount of storage space used by a computing device when storing such a digest. By reducing the storage space used, the computer itself that is storing the digest (including those computers that may access the digest to perform some analysis on the digest) have reduced space requirements and burden on storage resources. Thus, embodiments of the present disclosure may improve the performance of a computer itself.

With respect to improving the operation of a network, the reduced data set digest may decrease the size of the digest that is communicated over a network, allowing for reduced network bandwidth requirements, thus preserving valuable network resources. By way of example, if a single bit is used to represent each user in a reduced set digest rather than an 8-bit value, the digest is one eighth of the size. Thus, for each user requesting the digest in order to perform analysis on the digest, the digest being transported across the network may be one eighth of the size, preserving valuable network resources. Thus, embodiments of the present disclosure may improve the functioning of the network by preserving network resources.

Embodiments of the present disclosure are explained with reference to the accompanying drawings.

Figure 1:
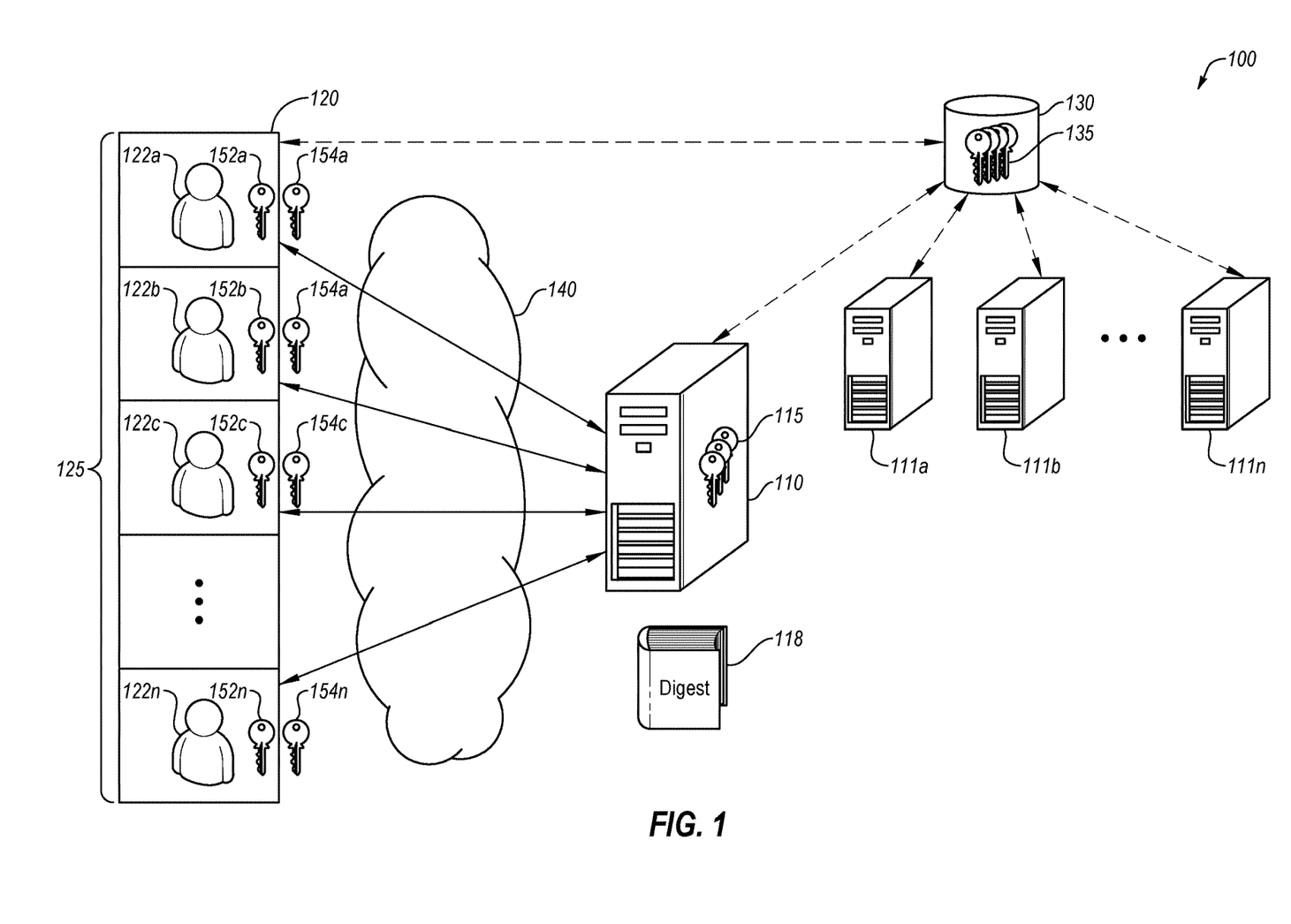
FIG. 1 illustrates an example system related to a reduced data set digest.

FIG. 1 illustrates an example system 100 related to a reduced data set digest, in accordance with one or more embodiments of the present disclosure. The system 100 may include a publisher 110 and/or additional publishers 111 (e.g., the publishers 111a, 111b, . . . , 111n). The publisher 110 may be in communication with a set of users 120. For example, the set of users 120 may include a first user 122a, a second user 122b, a third user 122c, . . . , and an n user 122n. The publisher 110 may publish a digest 118, such as a reduced data set digest, that may be accessed by the users 122. For example, the first user 122a may utilize an electronic device (not illustrated) to communicate over a network 140 to the publisher 110 to view the digest 118. The digest 118 may indicate whether or not a particular user of the set of users 120 is included in a designated set of users 125. In these and other embodiments, the digest 118 may maintain anonymity between the inquiring user and all other users such that the inquiring user may determine whether the inquiring user is in the designated set of users 125 without being able to determine that information for any other user.

In some embodiments, the users 122 may generate private keys 152 and public keys 154. For example, the users 122a-n may each generate a private key 152a-n and a public key 154a-n. The users 122 may broadcast, publish, or otherwise distribute their public keys 154 while storing their private keys 152 in a secure manner. For example, the first user 122a may transmit the public key 154a to the publisher 110. As another example, the first user 122a may provide the public key 154a to a central repository 130 for storing keys. An example of such actions taken by a user may be described with reference to FIG. 2. Additionally, mathematical operations associated with such actions are described below.

In some embodiments, a given user, such as the first user 122a, may have a unique identifier associated with the given user. For example, the unique identifier of the first user 122a may be a numerical identifier of where in the set 120 the first user 122a falls. For example, if the first user 122a were the first user in the set 120, the numerical identifier of the first user 122a may be one.

In some embodiments, the publisher 110 may utilize information from the users 122 and information regarding whether the users 122 are in the designated set 125 to generate the digest 118. In some embodiments the digest 118 may include a concatenation of: (1) a random string or unique identifier associated with the digest 118 and/or an entity publishing the digest 118, and (2) a reduced data set for each of the users 120 that indicates whether or not the associated user is in the designated set 125. Each of the reduced data sets may be stored in an encrypted form such that a given reduced data set is discernable using a private key of the user 122 associated with the reduced data set. In these and other embodiments, units aside from the inquiring user may not be able to determine whether or not the inquiring user is in the designated set 125. Additionally, the inquiring user may not be able to determine whether or not other users are in the designated set 125. Examples of methods of generation of a digest are described in greater detail with respect to FIGS. 3 and 5. Additionally, mathematical operations associated with such methods are described below.

In some embodiments, the publisher 110 may store one or more keys 115. For example, the keys 115 may include a private key of the publisher 110. Additionally or alternatively, the publisher 110 may store the public keys 154 of the users 122 as the keys 115.

The publisher 110 may post the digest 118 in a location accessible by the users 122. The users 122 may access the digest 118 to determine whether or not users 122 are part of the designated set 125. For example, the first user 122a may access the digest 118 and utilize the first user private key 152a to determine whether or not the first user 122a is in the designated set 125. The first user 122a may be unable to determine whether or not any of the other users in the set of users 120 is in the designated set 125. Examples of such methods of analyzing the digest 118 are described in greater detail with respect to FIGS. 4 and 6. Additionally, mathematical operations associated with such methods are described below.

In some embodiments, the publisher 110 may be associated with or be operated by an organization with any of a variety of reasons for posting, publishing, or otherwise disseminating the information to the users in the designated set 125 that they are in the designated set 125. For example, the publisher 110 may have a legal obligation to notify a user when their data has been used (e.g., in advertising), has been compromised (e.g., when a security breach has occurred or credit card information has been stolen), or has been moved. For example, certain European Union regulations may impose a duty to provide such notification. As another example, a mortgage company may sell or trade a large number of mortgages and may publish information regarding the mortgages sold or transferred. For example, the publisher 110 posting the digest 118 may operate like a digital bulletin board where inquiring users may check to see if they are part of the designated set 125 without any other users being able to see what users 122 are or are not in the designated set 125.

In some embodiments, the publisher 110 may operate in conjunction with a blockchain with one or more channels. A blockchain may include an information exchange medium over which information may be posted for others to view. A channel within a blockchain may include one chain of communication. For example, a new channel may be formed related to a certain stock trade or selling of certain rights/options, and the digest 118 may be published with the designated set 125 indicating those affected. An identification of the channel discussing the transaction may also be published with the digest 118. Additionally or alternatively, the publisher 110 may operate in conjunction with a blockchain (e.g., an open ledger of transactions that may involve digital currency). For example, as events occur along one blockchain, the publisher 110 may post the digest 118 where the designated set 125 may indicate users who had transactions along the blockchain or who were affected by the transaction along the blockchain. In some embodiments, the digest 118 may be posted in association with one or more other blockchains such that a user of a first blockchain who is affected by a transaction in a second blockchain may have the digest of the second blockchain posted in associated with the first blockchain. In some embodiments, the communication between blockchains may be associated with a global synchronization log that provides communication and/or synchronization between blockchains or between various other ledgers. By using an anonymous digest such as the digest 118, such notification between ledgers may occur while maintaining anonymity.

The additional publishers 111 may operate in a similar or comparable manner to the publisher 110. For example, the additional publishers 111 may generate and publish one or more digests similar or comparable to the digest 118 such that users may determine whether or not they are in a designated set. In some embodiments, the additional publishers may operate on the same set of users 120 with potentially different designated sets. Additionally or alternatively, the additional publishers 111 may operate on a new set of users and designated sets.

The central repository 130 may include any device or system configured to maintain public keys of one or more entities. For example, the central repository 130 may store public keys for one or more users 122 of the set of users 120.

The publisher 110 and/or the additional publishers 111 may obtain the public keys of the users 122 from the central repository. Additionally or alternatively, the central repository 130 may store public keys for one or more of the publisher 110 and/or the additional publishers 111. In these and other embodiments, the users 122 may obtain the public keys of the publisher 110 and/or the additional publishers 111 from the central repository 130. In some embodiments, the central repository 130 may be maintained by a standards organization or other reliable source such that a user and/or publisher may have confidence in the public keys obtained from the central repository 130. The central repository 130 may additionally store any other information to be accessed by the users 122 and/or the publishers 110 and 111.

The network 140 may be implemented as a conventional type network, a wired or wireless network, and/or may have any of numerous different configurations or combinations thereof. Furthermore, the network 140 may include a local area network (LAN), a wide area network (WAN) (e.g., the Internet), or other interconnected data paths across which multiple devices and/or entities may communicate. In some embodiments, the network 140 may include a peer-to-peer network. The network 140 may also be coupled to or may include portions of a telecommunications network for sending data in a variety of different communication protocols. In some embodiments, the network 140 may include Bluetooth® communication networks or cellular communication networks for sending and receiving communications and/or data including via short message service (SMS), multimedia messaging service (MMS), hypertext transfer protocol (HTTP), direct data connection, wireless application protocol (WAP), e-mail, or other approaches. The network 140 may also include a mobile data network that may include third-generation (3G), fourth-generation (4G), long-term evolution (LTE), long-term evolution advanced (LTE-A), Voice-over-LTE ("VoLTE") or any other mobile data network or combination of mobile data networks.

While the users 122 are illustrated as communicating over the network 140 with the publisher 110, it will be appreciated that any of the components of the system 100 shown to communicate with one another may communicate over the network 140 or a similar or comparable network. For example, one or more of the users 122 may communicate with the central repository of keys 130. Additionally or alternatively, the additional publishers 111 may communicate with the central repository of keys 130 and/or users 122 over the network 140.

In some embodiments, the generation of the private keys 152 and/or the public keys 154 by the users 122 may be described using mathematical operations. For example, each of the n users of an index number (i) may include a unique identifier $id_i \in [1, n]$. Additionally, a group with description $\mathbb{G}$ of prime order p may be identified. The group $\mathbb{G}$ of prime order p may be identified based on the size of n. For example, a larger prime order may be utilized for larger sets of users. The private key 154 for a given user may be selected by sampling a value randomly from the space $\mathbb{Z}_p$. For example, by performing:

Sample $a_i \leftarrow \mathbb{Z}_p$, and

Set $sk_i = a_i$ where Sample may represent an operation to randomly select a value, Set may be an operation to assign a value to a variable, $a_i$ may represent an intermediate value for the $i^{th}$ user, and $sk_i$ may represent the private key 154 of the $i^{th}$ user.

The public key 152 may be derived by raising a known value (g) from the group $\mathbb{G}$ to the power of the intermediate value. For example, by performing the operation:

Set $k_i = g^{a_i}$.

Additionally or alternatively, in some embodiments, the publisher 110 may generate a public key and a private key. For example, using mathematical operators, the publisher 110 may perform the operations of:

Sample $a_S \leftarrow \mathbb{Z}_p$

Set $sk_S = a_S$

Set $pk_S = g^{a_S}$

Where Sample, Set, $\mathbb{Z}_p$, and g are as described above, $a_s$ may represent an intermediate value for the publisher 110, $sk_s$ may represent the private key of the publisher 110, and $pk_S$ may represent the public key of the publisher 110. In these and other embodiments, the publisher 110 may broadcast, publish, or otherwise distribute its public key $pk_s$ and may securely store its private key $sk_s$.

In some embodiments, generating the digest 118 when the publisher 110 has not generated a public/private key may be described using mathematical operations. For example, the publisher 110 may obtain: the numerical identifier for each user in the set of users 120 (e.g., $id_i$), information for each user (e.g., for each id) indicating whether or not the user is in the designated set 125 (e.g., $b_{id} \in \{0,1\}$), the known value (g) from the group $\mathbb{G}$, and the public keys for each user in the set of users (e.g., $\langle pk_i \rangle_i$). The publisher 110 may also obtain a random string associated with the secure form of the reduced data sets by taking a random sample (r) from the space $\mathbb{Z}_p$ and raising g to the power of r. For example, by performing the operations:

Sample $r \leftarrow \mathbb{Z}_p$, and

Set nonce = $g^r$ where nonce is the random string associated with the secure form of the reduced data sets. Additionally, generating the digest 118 may include determining the reduced data sets for each of the users in a secure form. In these and other embodiments, such an operation may be performed by adding randomness to the information for each user of whether or not the user is included in the designated set 125. For example, the publisher 110 may perform the operation:

$c_i = \text{HardCoreBit}(pk_i^r) \oplus b_i$ where $c_i$ may include the reduced data set, HardCoreBit may be an operation to extract a random bit based on the public key $pk_i$ and the r used to determine nonce, $\oplus$ may represent an XOR operation (e.g., if an odd number of inputs is 1, the output is 1, and if an even number of inputs is 0, the output is 0), and $b_i$ may represent the information (e.g., the bit) indicative of whether or not the user of $id_i$ is in the designated set 125. The operation HardCoreBit may be similar or comparable to the operation described in "A Hard-Core Predicate For All One-Way Functions," Goldreich and Levin, *Proceedings of the Twenty First Annual ACM Symposium on Theory of Computing*, pp. 23-32, 1989, which is incorporated by reference herein in its entirety. In some embodiments, the publisher 110 may perform a concatenation of the random string associated with the secure form of the reduced data sets and the reduced data sets. For example, the publisher 110 may output as the digest 118:

$$\text{nonce}|c_1|\ldots|c_n$$

In some embodiments, generation of the digest 118 by the publisher 110 where the publisher 110 has generated private and public keys may be described using mathematical operators. For example, the publisher 110 may obtain: the numerical identifier for each user in the set of users 120 (e.g., $id_i$), information (b) for each user (e.g., for each id) indicating whether or not the user is in the designated set 125 (e.g., $b_{id} \in \{0,1\}$) (which may be represented by a single bit, e.g. 0 to indicate the user is not in the designated set 125 and 1 to indicate the user is in the designated set 125), the description of the group $\mathbb{G}$ of prime order p, and the public keys for each user in the set of users (e.g., $\langle pk_i \rangle_i$). The publisher 110 may also obtain a unique identifier (d) for the digest 118. The unique identifier for the digest 118 may take any value, such as a timestamp of when the digest is generated, a block number where the digest 118 is stored, etc. Additionally or alternatively, the publisher 110 may determine a reduced-data-set key ($k_i$) for each of the users based on the private key of the publisher 110 and the public keys of the users:

$$k_i = pk_i^{sk_s}$$

The publisher 110 may additionally determine the reduced data sets (c) for each of the users 122. For example, the publisher 110 may perform the operation:

$$c_i = \text{PRF}_{k_i}(d) \oplus b_i$$

where $c_i$ represents the reduced data set for the $i^{th}$ user, $\text{PRF}_{k_i}$ may be a function, such as a pseudo-random function, to extract a single bit based on the reduced-data-set key $k_i$ and the unique identifier of the digest 118 (d), and $\oplus$ and $b_i$ are similar to above. The operation $\text{PRF}_{k_i}$ may be similar or comparable to the operation described in "How To Construct Random Functions," Goldreich, Oded, Goldwasser, and Micali, 25$^{th}$ Annual Symposium on Foundations of Computer Science, 1984, which is incorporated by reference herein in its entirety. In some embodiments, the publisher 110 may perform a concatenation of the unique identifier of the digest 118 and the reduced data sets. For example, the publisher 110 may output as the digest 118:

$$d|c_1|\ldots|c_n$$

In some embodiments, an inquiring user may obtain and analyze the digest 118. In these and other embodiments, the inquiring user may obtain the entire digest 118 from the publisher 110. Additionally or alternatively, the inquiring user may obtain a portion of the digest 118, such as the unique identifier and/or other random string associated with the secure form of the reduced data sets in the digest and the reduced data set associated with the id of the inquiring user. For example, if the inquiring user is associated with the 10$^{th}$ id, the inquiring user may obtain the unique identifier (d)/random string (nonce) and the reduced data set of the user ($c_{10}$).

In some embodiments, the analysis of the digest 118 may be described by mathematical operations. For example, in embodiments in which the publisher 110 may not have generated a private/public key, the inquiring user may obtain the digest 118 and/or the random string (nonce) associated with the secure form of the reduced data sets in the digest 118 and the reduced data set ($c_i$) associated with the identifier ($id_i$) of the inquiring user. The inquiring user may determine the intermediate value (k) based on the private key of the user ($sk_i$) and the random string (nonce):

$$k = \text{nonce}^{sk_i}$$

Using the intermediate value (k) and the reduced data set, the inquiring user may obtain the information ($b_i$) indicative of whether or not the inquiring user is in the designated set 125:

$$b_i = c_i \text{HardCoreBit}(k)$$

where $c_i$, HardCoreBit, and $\oplus$ may be the same as above. In some embodiments, the information ($b_i$) may include a single bit indicative of whether or not the inquiring user is part of the designated set 125. In these and other embodiments, without the private key of the inquiring user, the intermediate value (k) that will result in the same output from HardCoreBit may not be able to be determined such that anonymity is preserved among the inquiring user and the other users of the set of users 120.

In some embodiments, the analysis of the digest 118 may be described by mathematical operations in embodiments in which the publisher 110 may have generated a private/public key. For example, the inquiring user may obtain the digest 118 and/or the unique identifier (d) associated with the digest 118 and the reduced data set ($c_i$) associated with the identifier ($id_i$) of the inquiring user. The inquiring user may determine the reduced-data-set key ($k_i$) based on the private key of the user ($sk_i$) and the public key of the publisher 110 ($pk_s$):

$$k_i = pk_s^{sk_i}$$

In these and other embodiments, the inquiring user may store the reduced-data-set key ($k_i$) for future digests published by the publisher 110 as the value is based on the keys of the two, rather than based on the digest 118. The inquiring user may retrieve the information ($b_i$) indicative of whether the inquiring user is in the designated set 125 from the reduced data set ($c_i$). For example, the inquiring user may perform the operation:

$$b_i = \text{PRF}_{k_i}(d) \oplus c_i$$

where PRF and $\oplus$ may be the same as above. In some embodiments, the information ($b_i$) may include a single bit indicative of whether or not the inquiring user is part of the designated set 125. In these and other embodiments, without the private key of the inquiring user, the reduced-data-set key ($k_i$) specific to the user may not be able to be determined such that anonymity is preserved among the inquiring user and the other users of the set of users 120.

Modifications, additions, or omissions may be made to the system 100 without departing from the scope of the present disclosure. For example, the system 100 may include any number of computing devices connected in any manner. In many cases, the system 100 may include more computing devices than illustrated. Additionally, the system 100 may include a large number of users in the set of users 120 and/or the designated set of users 125 (e.g., thousands, millions, etc.).

For each of the methods illustrated in FIGS. 2-6, the methods may be performed by any suitable system, apparatus, or device. For example, any of the publishers 110 or 111$a$-$n$ of FIG. 1, an electronic device associated with any of the users 122, a centralized repository 130, or other systems or devices may perform one or more of the operations associated with the methods. Although illustrated with discrete blocks, the steps and operations associated with one or more of the blocks of the methods may be divided into additional blocks, combined into fewer blocks, or eliminated, depending on the desired implementation.

Additionally, for each of the methods illustrated in FIGS. 2-6, modifications, additions, or omissions may be made to the methods without departing from the scope of the present disclosure. For example, the operations of the methods may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

Figure 2:
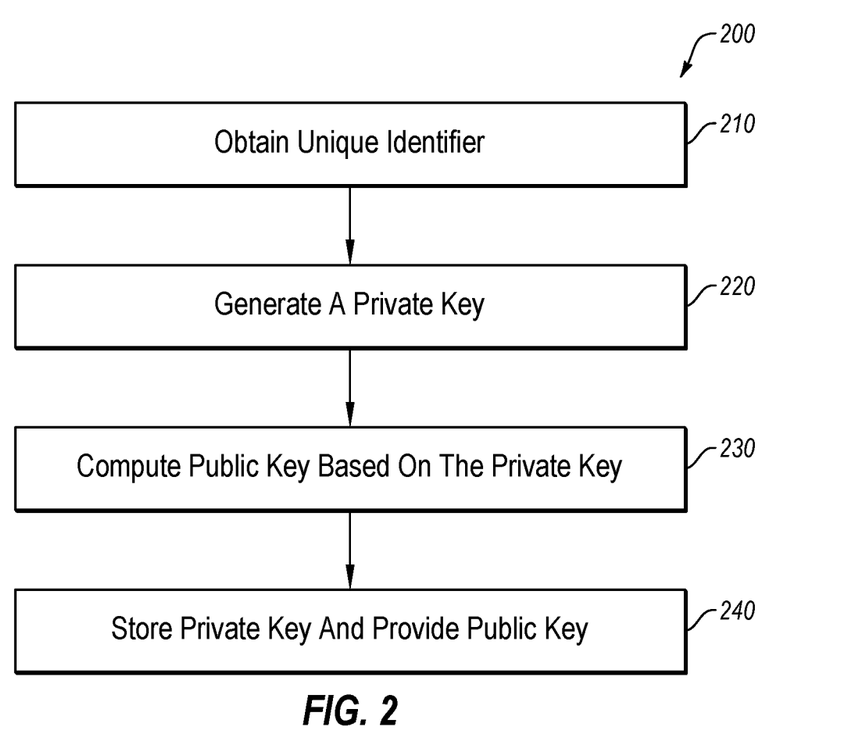
FIG. 2 illustrates a flowchart of an example method of generating public and private keys.

FIG. 2 illustrates a flowchart of an example method 200 of generating public and private keys, in accordance with one or more embodiments of the present disclosure. In some embodiments, a user (e.g., via an electronic device) or a publisher may perform the operations of the method 200 to generate public and private keys that may be used in the generation of and/or analysis of a reduced data set digest.

At block 210, a unique identifier may be obtained. For example, a user (e.g., the user 122 of FIG. 1) and/or a publisher (e.g., the publisher 110 of FIG. 1) may obtain a unique identifier. The unique identifier may be a publicly available value and/or an index of the user/publisher. For example, the unique identifier of the user may identify to the user where in a digest a reduced data set for the user is located.

At block 220, a private key may be generated. For example, the publisher and/or the user may generate a private key by sampling a random value from the space $\mathbb{Z}_p$.

At block 230, a public key may be generated based on the private key. For example, the public key may include a known value (g) to the power of the private key.

At block 240, the private key may be stored and the public key may be provided to one or more other devices. For example, the user may store the generated private key in a secure manner such that other devices may not have access to the private key. As another example, the public key may be provided to a central repository of public keys. Additionally or alternatively, the public key may be provided directly to the publisher, or placed in a location on an electronic device of the user accessible by the publisher to be retrieved by the publisher.

Figure 3:
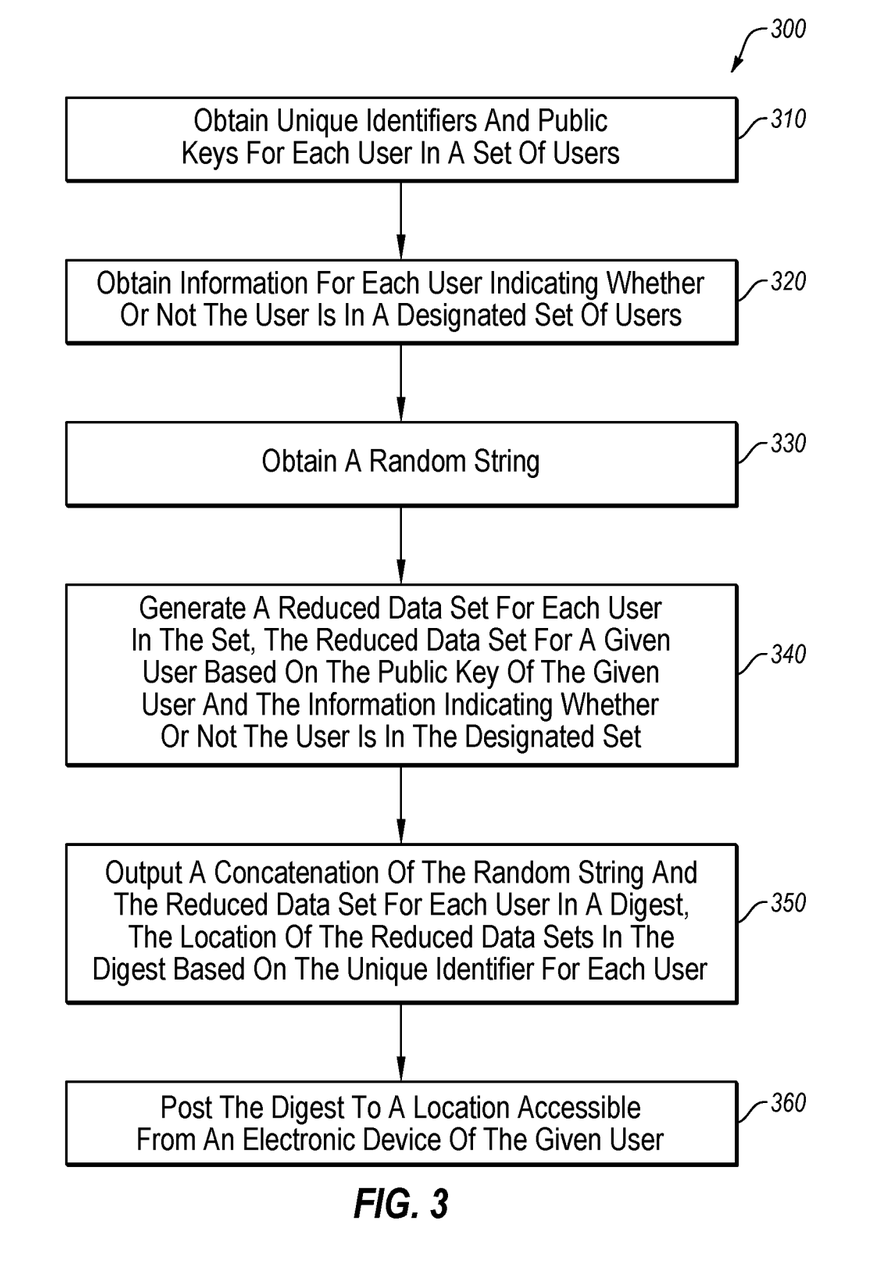
FIG. 3 illustrates a flowchart of an example method of generating a reduced data set digest.

FIG. 3 illustrates a flowchart of an example method 300 of generating a reduced data set digest, in accordance with one or more embodiments of the present disclosure. For example, a publisher may perform the method 300 to generate the reduced data set digest.

At block 310, unique identifiers and public keys for each of the users in a set of users may be obtained. For example, a publisher (e.g., the publisher 110 of FIG. 1) may obtain unique identifiers (e.g., i for each user) and the public keys (e.g., $pk_i$) for each user in a set of users. The unique identifiers and public keys may be obtained from the users or from a central repository, such as the central repository 130 of FIG. 1.

At block 320, information for each user indicating whether or not the user is in a designated set of users may be obtained. For example, information (b) for each user may be obtained. In some embodiments, the information may be a single bit for each user.

At block 330, a random string may be obtained. The random string (e.g., nonce) may be unique to the digest being generated, or may be shared among multiple digests. In these and other embodiments, the random string may be determined via an intermediate random sample (r). For example, (r) may be sampled at random from the space $\mathbb{Z}_p$ and a known value (g) from the group $\mathbb{G}$ may be raised to the power of (r) to obtain the random string.

At block 340, a reduced data set may be generated for each user in the set of users. The reduced data set ($c_i$) for a given user may be based on the public key ($pk_i$) of the given user and the information ($b_i$) indicating whether or not the user is in the designated set. Additionally or alternatively, the reduced data set may be based on the random string. In these and other embodiments, the reduced data set may be a single bit. In some embodiments, the random string may be associated with a secure form of reduced data sets in the digest. For example, the reduced data set may be based on the information indicating whether or not the user is in the designated set but that bit may be processed such that it is indiscernible without the private key of the given user. In some embodiments, the reduced data set may be generated using the mathematical operation $c_i = \text{HardCoreBit}(pk_i^r) \oplus b_i$. For example, the publisher may perform a HardCoreBit function on the public key of the user, and perform an XOR operation with the output of the HardCoreBit function to derive the reduced data set ($c_i$).

At block 350, a concatenation of the random string and the reduced data set for each user may be output as the digest. In these and other embodiments, the location of the reduced data sets in the digest may be based on the unique identifier of the users. For example, each user may have a numerical value as their unique identifier and the reduced data sets may be organized in numerical order according to the unique identifiers.

At block 360, the digest may be posted to a location accessible from an electronic device of the given user. For example, the publisher may post the digest to a website known to host such digests. As another example, the publisher may post the digest to a channel in a blockchain.

Figure 4:
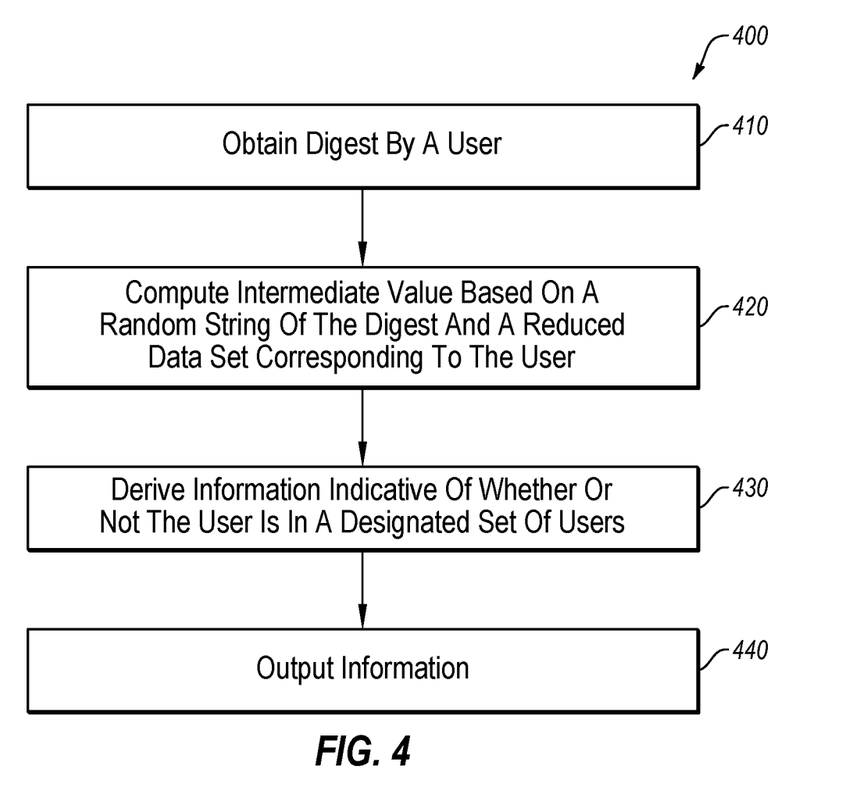
FIG. 4 illustrates a flowchart of an example method of analyzing a reduced data set digest.

FIG. 4 illustrates a flowchart of an example method 400 of analyzing a reduced data set digest, in accordance with one or more embodiments of the present disclosure. For example, a user may perform the method 400 to analyze the reduced data set digest to determine whether or not the user is in a designated set.

At block 410, a user may obtain a digest. Additionally or alternatively, the user may obtain portions of the digest. For example, rather than obtaining the entire digest, the user may obtain a random string associated with the digest and located in the digest and a reduced data set in the digest associated with the user.

At block 420, an intermediate value may be computed based on the random string of the digest and the reduced data set corresponding to the user. For example, the user may compute the intermediate value (k) by raising the random string (nonce) to the power of the private key ($sk_i$).

At block 430, information indicative of whether or not the user is in a designated set of users may be derived. For example, the user may perform a HardCoreBit function on the intermediate value, and perform an XOR operation with the output of the HardCoreBit function to derive the information ($b_i$) indicative of whether or not the user is in the designated set. In some embodiments, the information is a single bit.

At block 440, the information may be output. For example, an electronic device of the user that performed the operations of the block 410, 420, and/or 430 may output the information obtained at the block 430. For example, the device may display whether or not the user is in the designated set. Additionally or alternatively, the device may broadcast or otherwise provide the information to another electronic device.

Figure 5:
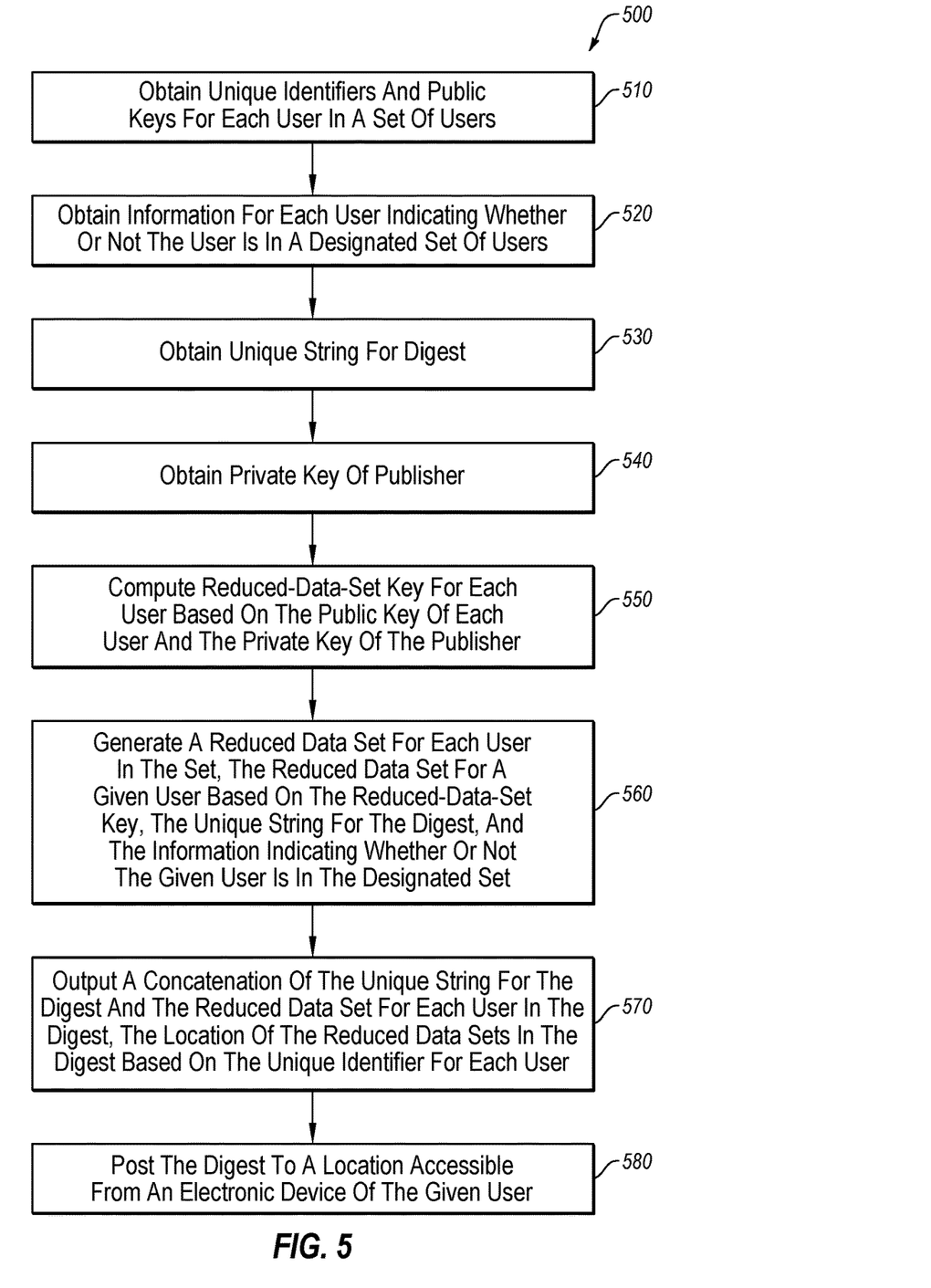
FIG. 5 illustrates a flowchart of another example method of generating a reduced data set digest.

FIG. 5 illustrates a flowchart of another example method 500 of generating a reduced data set digest, in accordance with one or more embodiments of the present disclosure. For example, a publisher may perform the method 500 to generate the reduced data set digest.

At block 510, unique identifiers and public keys for each of the users in a set of users may be obtained. The block 510 may be similar or comparable to the block 310 of FIG. 3.

At block 520, information for each user indicating whether or not the user is in a designated set of users may be obtained. The block 520 may be similar or comparable to the block 320 of FIG. 3.

At block 530, a unique string may be obtained for the digest. The unique string (d) may be any piece of information, and need not be confidential. For example, the unique string may be a timestamp of the request for the creation of the digest, a block number where the digest may be stored, etc. or any other value.

At block 540, a private key of the publisher may be obtained. For example, the publisher may generate the private key ($sk_s$) or may obtain the private key from a trusted electronic device. An example method of generating a private key is explained with reference to FIG. 2.

At block 550, a reduced-data-set key may be generated for each user in the set of users. The reduced-data-set key ($k_i$) for each user may be based on the public key of each user and the private key of the publisher. For example, the public key of a given user may be raised to the power of the private key of the publisher to obtain the reduced-data-set key. In these and other embodiments, the reduced-data-set key may be stored by the user and/or the publisher for later digests involving the user and published by the publisher.

At block 560, a reduced data set may be generated for each user in the set of users. The reduced data set for a given user ($c_i$) may be based on the reduced-data-set key ($k_i$), the unique string for the digest (d), and the information ($b_i$) indicating whether or not a given user is in the designated set. For example, the reduced data set may be based on performing a pseudo-random function (e.g., $PRF_{k_i}$) on the reduced-data-set key and performing an XOR operation between the output of the function and the information ($b_i$).

At block 570, a concatenation of the unique string for the digest and the reduced data set for each user may be output as the digest. In these and other embodiments, the location of the reduced data sets in the digest may be based on the unique identifier of the users. For example, each user may have a numerical value as their unique identifier and the reduced data sets may be organized in numerical order according to the unique identifiers.

At block 580, the digest may be posted to a location accessible from an electronic device of the given user. The block 580 may be similar or comparable to the block 360 of FIG. 3.

Figure 6:
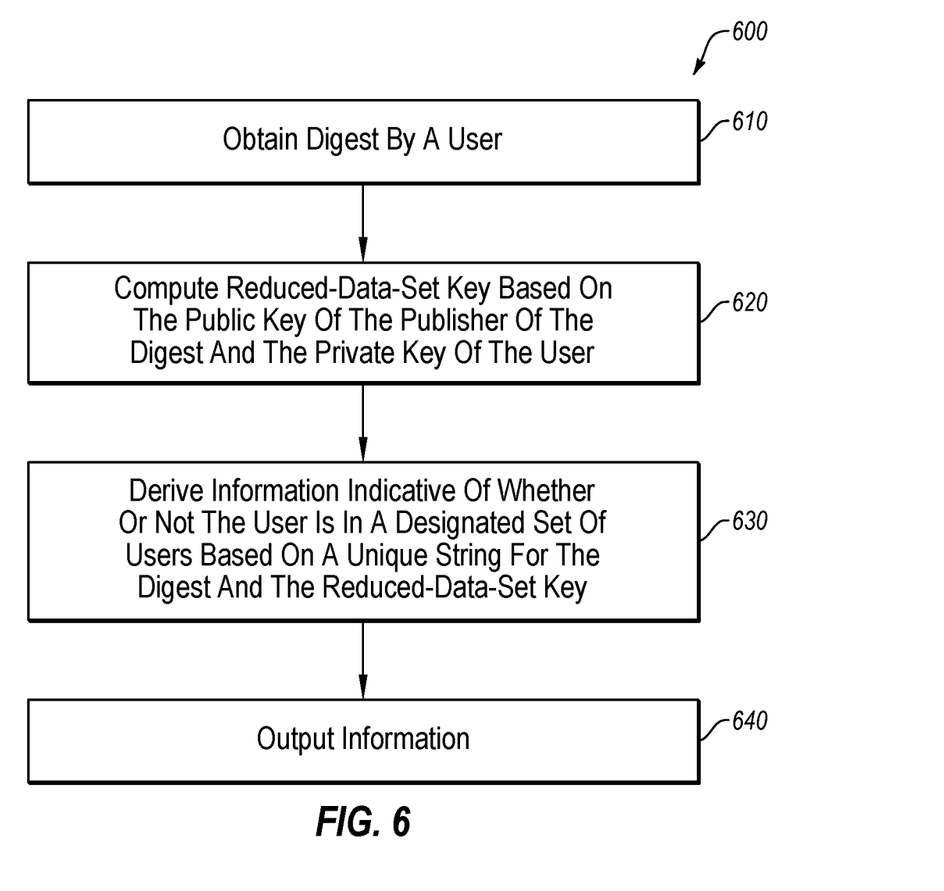
FIG. 6 illustrates a flowchart of another example method of analyzing a reduced data set digest.

FIG. 6 illustrates a flowchart of another example method 600 of analyzing a reduced data set digest, in accordance with one or more embodiments of the present disclosure. For example, a user may perform the method 600 to analyze the reduced data set digest to determine whether or not the user is in a designated set.

At block 610, a digest may be obtained by a user. The operation 610 may be similar or comparable to the block 410 of FIG. 4.

At block 620, a reduced-data-set key may be computed based on the public key of the publisher of the digest and the private key of the user. For example, the user may compute the reduced-data-set key ($k_i$) by raising the public key of the publisher ($pk_s$) to the power of the private key of the user ($sk_i$).

At block 630, information indicative of whether or not the user is in a designated set of users may be derived based on a unique string for the digest and the reduced-data-set key. For example, the user may perform a pseudo-random function that incorporates or is based on the reduced-data-set key ($PRF_{k_i}$) on the unique string for the digest (d) and perform an XOR operation on the output of the pseudo-random function with the reduced data set ($c_i$) of the user to derive the information ($b_i$) indicative of whether or not the user is in the designated set.

At block 640, the information may be output. The operation 640 may be similar or comparable to the block 440 of FIG. 4.

Figure 7:
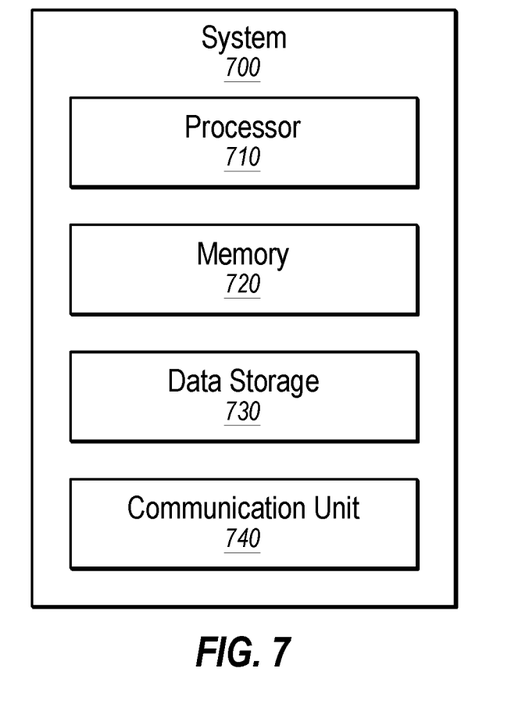
FIG. 7 illustrates an example computing system.

FIG. 7 illustrates an example computing system 700, according to at least one embodiment described in the present disclosure. The system 700 may include any suitable system, apparatus, or device configured to communicate over a network. The computing system 700 may include a processor 710, a memory 720, a data storage 730, and a communication unit 740, which all may be communicatively coupled. The data storage 730 may include various types of data, such as public keys, private keys, reduced data set digests, etc.

Generally, the processor 710 may include any suitable special-purpose or general-purpose computer, computing entity, or processing device including various computer hardware or software modules and may be configured to execute instructions stored on any applicable computer-readable storage media. For example, the processor 710 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 7, it is understood that the processor 710 may include any number of processors distributed across any number of network or physical locations that are configured to perform individually or collectively any number of operations described in the present disclosure. In some embodiments, the processor 710 may interpret and/or execute program instructions and/or process data stored in the memory 720, the data storage 730, or the memory 720 and the data storage 730. In some embodiments, the processor 710 may fetch program instructions from the data storage 730 and load the program instructions into the memory 720.

After the program instructions are loaded into the memory 720, the processor 710 may execute the program instructions, such as instructions to perform the methods 200, 300, 400, 500, or 600 of FIGS. 2, 3, 4, 5, and 6, respectively. For example, the processor 710 may obtain instructions regarding generating one or more keys, generating a reduced data set digest, or analyzing such a digest.

The memory 720 and the data storage 730 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 710. In some embodiments, the computing system 700 may or may not include either of the memory 720 and the data storage 730.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 710 to perform a certain operation or group of operations.

The communication unit 740 may include any component, device, system, or combination thereof that is configured to transmit or receive information over a network. In some embodiments, the communication unit 740 may communicate with other devices at other locations, the same location, or even other components within the same system. For example, the communication unit 740 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 740 may permit data to be exchanged with a network and/or any other devices or systems described in the present disclosure. For example, the communication unit 740 may allow the system 700 to communicate with other systems, such as computing devices and/or other networks.

Modifications, additions, or omissions may be made to the system 700 without departing from the scope of the present disclosure. For example, the data storage 730 may be multiple different storage mediums located in multiple locations and accessed by the processor 710 through a network.

As indicated above, the embodiments described in the present disclosure may include the use of a special purpose or general purpose computer (e.g., the processor 710 of FIG. 7) including various computer hardware or software modules, as discussed in greater detail below. Further, as indicated above, embodiments described in the present disclosure may be implemented using computer-readable media (e.g., the memory 720 or data storage 730 of FIG. 7) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, or some other hardware) of the computing system. In some embodiments, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," among others).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method comprising:
   obtaining a plurality of public keys associated with a set of users, each user of the set of users associated with a unique public key and a unique private key, the plurality of public keys including the unique public keys of the set of users;
   obtaining a designated set of users, the designated set of users being a subset of the set of users;
   generating, using the plurality of public keys, a digest associated with the designated set of users, the digest including a plurality of reduced data sets in a secure form, each user of the set of users associated with one of the plurality of reduced data sets, the reduced data sets being indicative of whether a given user is in the designated set of users, the reduced data set associated with the given user only observable using the private key of the given user such that a different user from the given user is unable to observe the reduced data set associated with the given user without the private key of the given user, wherein generating the digest comprises:
      obtaining an identifier associated with each user of the set of users, the identifier identifying a location of the reduced data set of an associated user in the digest; and
      outputting a concatenation of a random string associated with the secure form of the plurality of reduced data sets, the plurality of reduced data sets arranged in the digest according to the identifiers of the set of users; and
   posting the digest to a location accessible from an electronic device of the given user.

2. The method of claim 1, wherein generating the digest further comprises
   generating the reduced data set for each user of the set of users.

3. The method of claim 2, wherein the random string is specific to the digest.

4. The method of claim 2, wherein the random string is used in multiple digests.

5. The method of claim 1, wherein the reduced data set includes a single bit indicative of whether the given user is part of the designated set of users.

6. The method of claim 1, wherein anonymity is maintained between the given user and the rest of the set of users, such that the given user is unable to determine whether any of the rest of the set of users is in the designated set of users.

7. The method of claim 1, wherein the public key is obtained from a repository of public keys.

8. The method of claim 7, wherein the repository of public keys is maintained by a standards organization.

9. A system comprising:
   one or more processors; and
   one or more non-transitory computer-readable media that include instructions that, when executed by the one or more processors, are configured to cause the system to perform operations, the operations comprising:
      obtaining a plurality of public keys associated with a set of users, each user of the set of users associated with a unique public key and a unique private key, the plurality of public keys including the unique public keys of the set of users;
      obtaining a designated set of users, the designated set of users being a subset of the set of users;
      generating, using the plurality of public keys, a digest associated with the designated set of users, the digest including a plurality of reduced data sets in a secure form, each user of the set of users associated with one of the plurality of reduced data sets, the reduced data sets being indicative of whether a given user is in the designated set of users, the reduced data set associated with the given user only observable using the private key of the given user such that a different user from the given user is unable to observe the reduced data set associated with the given user without the private key of the given user, wherein generating the digest comprises:
         obtaining an identifier associated with each user of the set of users, the identifier identifying a location of the reduced data set of an associated user in the digest; and
         outputting a concatenation of a random string associated with the secure form of the plurality of reduced data sets, the plurality of reduced data sets arranged in the digest according to the identifiers of the set of users; and
      posting the digest to a location accessible from an electronic device of the given user.

10. The system of claim 9, wherein generating the digest further comprises
    generating the reduced data set for each user of the set of users.

11. The system of claim 9, wherein the reduced data set includes a single bit indicative of whether the given user is part of the designated set of users.

12. The system of claim 9, wherein anonymity is maintained between the given user and the rest of the set of users, such that the given user is unable to determine whether any of the rest of the set of users is in the designated set of users.

13. The system of claim 9, wherein the public key is obtained from a repository of public keys.

14. The system of claim 13, wherein the repository of public keys is maintained by a standards organization.

15. One or more non-transitory computer-readable media that include instructions that, when executed by one or more processors, are configured to cause a system to perform operations, the operations comprising:
    obtaining a plurality of public keys associated with a set of users, each user of the set of users associated with a unique public key and a unique private key, the plurality of public keys including the unique public keys of the set of users;

obtaining a designated set of users, the designated set of users being a subset of the set of users;

generating, using the plurality of public keys, a digest associated with the designated set of users, the digest including a plurality of reduced data sets in a secure form, each user of the set of users associated with one of the plurality of reduced data sets, the reduced data sets being indicative of whether a given user is in the designated set of users, the reduced data set associated with the given user only observable using the private key of the given user such that a different user from the given user is unable to observe the reduced data set associated with the given user without the private key of the given user, wherein generating the digest comprises:

obtaining an identifier associated with each user of the set of users, the identifier identifying a location of the reduced data set of an associated user in the digest; and outputting a concatenation of a random string associated with the secure form of the plurality of reduced data sets, the plurality of reduced data sets arranged in the digest according to the identifiers of the set of users; and posting the digest to a location accessible from an electronic device of the given user.

16. The computer-readable media of claim 15, wherein generating the digest further comprises generating the reduced data set for each user of the set of users.

17. The computer-readable media of claim 15, wherein the reduced data set includes a single bit indicative of whether the given user is part of the designated set of users.

18. The computer-readable media of claim 15, wherein anonymity is maintained between the given user and the rest of the set of users, such that the given user is unable to determine whether any of the rest of the set of users is in the designated set of users.

19. The computer-readable media of claim 15, wherein the public key is obtained from a repository of public keys.

20. The computer-readable media of claim 19, wherein the repository of public keys is maintained by a standards organization.

* * * * *